(12) United States Patent
Durand et al.

(10) Patent No.: US 7,194,644 B2
(45) Date of Patent: Mar. 20, 2007

(54) SYSTEM AND METHOD FOR OPERATING A MICROPROCESSOR IN A LOW POWER MODE BY PROVIDING A WAKEUP CLOCK TO THE MICROPROCESSOR

(75) Inventors: Benoît Durand, Les Milles (FR); Jérôme Lacan, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 420 days.

(21) Appl. No.: 10/774,313

(22) Filed: Feb. 6, 2004

(65) Prior Publication Data

US 2004/0221187 A1 Nov. 4, 2004

(30) Foreign Application Priority Data

Feb. 6, 2003 (FR) .................. 03 01420

(51) Int. Cl.
*G06F 1/32* (2006.01)
*G06F 1/04* (2006.01)

(52) U.S. Cl. ..................... 713/320; 713/600

(58) Field of Classification Search ............. 713/300, 713/320, 322, 500, 600, 601
See application file for complete search history.

(56) References Cited

U.S. PATENT DOCUMENTS

| 5,848,281 A | 12/1998 | Smalley et al. ....... 395/750.04 |
| 2002/0026596 A1 | 2/2002 | Kim .................... 713/322 |
| 2003/0070106 A1* | 4/2003 | Kosuda et al. ........... 713/500 |

FOREIGN PATENT DOCUMENTS

EP 0 316 943 A2 5/1989
FR 2 832 565 A1 5/2003

OTHER PUBLICATIONS

FS6128-01 PLL Clock Generator IC with VCXO, Feb. 27, 2002, AMI Semiconductor, p. 4.*
NJU6379D 1.8V Operation 3rd. Over Tone Quartz Crystal Oscillator, Feb. 25, 2003, New Japan Radio Co. Ltd., p. 3.*

* cited by examiner

Primary Examiner—Thomas C. Lee
Assistant Examiner—Mark Connolly
(74) Attorney, Agent, or Firm—Lisa K. Jorgenson; David V. Carlson; Seed IP Law Group PLLC (57) ABSTRACT

The present invention relates to an integrated circuit comprising a central processing unit clocked by a clock signal, a main oscillator circuit supplying a first clock signal and a peripheral circuit supplying a periodic wake up signal, the central processing unit comprising a first operating mode at full power, in which the first clock signal is applied to the central processing unit, and an active halt mode in which the main oscillator circuit and the central processing unit are deactivated, the central processing unit being awakened by the periodic wake-up signal. According to the present invention, the integrated circuit comprises a secondary oscillator circuit for supplying a second clock signal of lower frequency than the first clock signal and a circuit for managing clock signals arranged for, upon the wake-up of the central processing unit at the end of the active halt mode, waking up the secondary oscillator circuit and applying the second clock signal to the central processing unit so as to clock the central processing unit to the lower frequency of the second clock signal and thus obtain a second operating mode with reduced current consumption relative to the first operating mode.

25 Claims, 8 Drawing Sheets

SYSTEM AND METHOD FOR OPERATING A MICROPROCESSOR IN A LOW POWER MODE BY PROVIDING A WAKEUP CLOCK TO THE MICROPROCESSOR

BACKGROUND OF THE INVENTION

1. Field of the Invention

The present invention relates to microprocessors and more particularly the generation of clock signals in the microprocessors and the operating modes of the microprocessors.

2. Description of the Related Art

Figure 1:
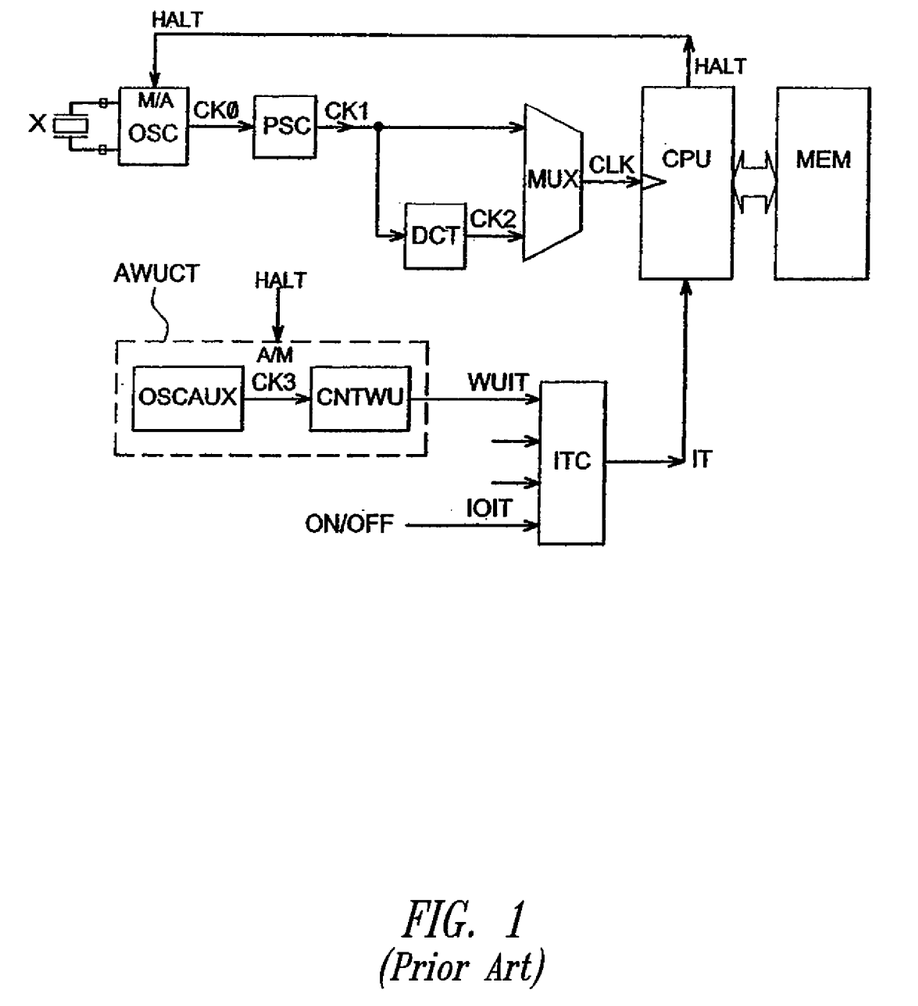
FIG. 1, described above, represents a microprocessor with a clock circuit and a wake-up circuit of known type.

FIG. 1 represents the structure of a classical microprocessor. The microprocessor comprises a central processing unit CPU for performing the program operations in connection with a memory MEM allowing the data and the program instructions to be stored. The operation of the CPU is clocked by a main clock signal CLK coming from a clock generation circuit comprising a quartz X oscillator circuit OSC. A frequency divider circuit PSC (prescaler) lowers the frequency of the signal CKO coming from the oscillator OSC and delivers the main clock signal CK1 that determines the nominal working frequency of the CPU. Another frequency divider circuit DCT is bypass positioned on the line of the main clock signal CK1 to supply another clock signal CK2 of lower frequency than the clock signal CK1. A multiplexer circuit receives the two clock signals CK1, CK2 to apply one of the two selected signals CK1 or CK2 at clock signal input CLK of the CPU.

The central processing unit CPU controls the operation of the oscillator OSC by a control signal HALT applied as an on/off command M/A to the oscillator circuit OSC. When the CPU activates the signal HALT, the oscillator OSC switches off and there is no longer any clock signal, such that the operation of the CPU is interrupted.

At the same time, the signal HALT is applied as a start-up command A/M of an auxiliary automatic wake-up circuit AWUCT (Auto Wake-Up) of the microprocessor. This self-contained circuit AWUCT generally comprises its own oscillator circuit OSCAUX the signal pulses CK3 of which are applied to a counting circuit CNTAWU to generate a signal pulse WUIT at the end of a time interval of predefined duration determining a periodical wake-up time base. The signal WUIT is applied as an interrupt signal to an interrupt decode circuit ITC. The circuit ITC receives, masks and codes the interrupt signals coming from various sources, such as the general start up/shutdown command button ON/OFF (reset interrupt IOIT or RESET) and the time base signal WUIT of the automatic wake-up circuit AWUCT, the only ones represented here.

Classically, these peripheral circuits allow the microprocessor to have several operating modes, with a view to globally reducing the electric current consumption of the circuit.

A microprocessor such as the one in FIG. 1, has a normal operating mode at full power, or mode RUN, a slow operating mode or mode SLOW, and a standby mode or mode ACTIVE HALT.

In the mode RUN, all the circuits of the microprocessor are awakened and operate at the nominal frequency of the main clock signal CK1, thus at full power. The mode RUN has the disadvantage of requiring considerable electric power since all the circuits of the microprocessor are awakened at their nominal frequency, very high (the consumption of an integrated circuit varies essentially according to the switch rate of the transistors).

In the mode SLOW, the CPU runs at the reduced frequency of the secondary clock signal CK2 (sub-multiple of the frequency CK1) such that the current consumption is divided. However, the current consumption remains high since the central processing unit and all the peripheral circuits are active, particularly the quartz oscillator circuit OSC, that is a high consuming item.

The mode HALT is implemented to avoid this excess consumption, when the CPU is in standby, without any particular operation to perform. In this case, the CPU applies the command HALT to the oscillator OSC, which interrupts the clock signals and the operation of the CPU itself. Thus, in the mode HALT, the central processing unit and the peripheral circuits are deactivated to limit the current consumption, except for the auxiliary circuit AWUCT activated by the command HALT, so as to wake up the CPU at regular time intervals to see to the operations to be performed. At the end of each time interval, one pulse of the signal WUIT generates an interrupt IT that "wakes up" the CPU and reactivates its operation in the execution mode RUN.

More precisely, at the time of the pulse WUIT, the oscillator OSC is awakened by the end of the mode HALT and starts to produce the signal CKO again. Upon start up, the establishment of the oscillations of the circuit OSC1 requires a stabilization time. A circuit counts a fixed number N of cycles of the signal CK1 to determine the duration of the stabilization phase. At the end of this phase STAB, the CPU resumes its normal operation in the mode RUN at the rate of the main clock signal CK1.

Upon this wake-up of the CPU in the mode RUN, the CPU scans the inputs/outputs, checks certain states, executes sub-program routines, and determines whether there are any operations to be performed.

In the affirmative, the CPU maintains its operating mode RUN at full power and executes the program of operations to be performed.

In the event that there are no operations to be performed, the CPU returns to the mode HALT by waking up the signal HALT to start a new cycle again.

Therefore, in microprocessors of known type, during the operation in the halt mode HALT, upon each periodical wake-up, the CPU, the clock circuits and all the peripheral circuits must wake themselves up in the execution mode RUN for a certain number of clock cycles, even if it transpires that there are no operations to be performed, which represents an unjustified excess consumption.

The defect of the microprocessors described above is that they require a high number of stabilization cycles upon the wake-up of the main clock circuit and of the CPU. Typically, depending on the models of microprocessor, it is necessary to wait for a duration in the order of $2^8$ to $2^{14}$ clock cycles (N=256 to 16,384 cycles) to end the stabilization phase of the oscillator, which represents a considerable number of cycles of operations.

Now, the duration of the stabilization time of the quartz precision oscillators used in the clock circuits of the known type microprocessors is inseparable from the degree of precision of the frequency of the oscillations of the clock signal, on which the accuracy of the internal time of the microprocessor depends for example (the higher the degree of precision of the periodicity of a signal is, the longer the time is to establish this periodic signal).

The disadvantage of this state of the art is that the circuits of the oscillator and of the central processing unit consume considerable electric power during this stabilization time, unnecessarily, without performing any operation.

Furthermore, in the case in which the CPU sees, at the end of the stabilization cycle, that there are no operations to be performed, it generates the signal HALT and returns to the halt mode HALT. Therefore, absurdly, the CPU wakes itself up and consumes electric power, in an unjustified manner, during the stabilization cycles, while it transpires that there are no operations to be performed.

BRIEF SUMMARY OF THE INVENTION

Therefore, one object of the present invention is to produce a microprocessor comprising operating modes with low current consumption.

One more particular object of the present invention is to reduce the current consumption of this microprocessor during the active halt mode cycles, and more precisely upon the wake-up phases at the end of the mode HALT.

Another object of the present invention is to limit the consumption of electric power, if the operations of the CPU do not require any during the execution mode.

Finally, another object of the present invention is to make the idle times due to the number of stabilization cycles of the oscillator circuits in the operation of the microprocessors disappear.

The present invention aims in particular to reduce the unjustified electrical losses over the duration of the stabilization time of the oscillator circuit, without permanently maintaining the power supply of the oscillator circuit which already represents a considerable current consuming item, and without losing the precision connected on principle to this stabilization time.

These objects are achieved by providing an integrated circuit comprising a central processing unit clocked by a clock signal, a main oscillator circuit supplying a first clock signal and a peripheral circuit supplying a periodic wake-up signal, the central processing unit comprising a first operating mode at full power, in which the first clock signal is applied to the central processing unit, and an active halt mode in which the main oscillator circuit and the central processing unit are deactivated, the central processing unit being awakened by the periodic wake-up signal, the integrated circuit comprising a secondary oscillator circuit for supplying a second clock signal of lower frequency than the first clock signal, and a circuit for managing clock signals arranged for, upon the wake-up of the central processing unit at the end of the active halt mode, waking up the secondary oscillator circuit and applying the second clock signal to the central processing unit so as to clock the central processing unit to the frequency of the second clock signal and thus obtain a second operating mode with reduced current consumption relative to the first operating mode.

According to one embodiment, the main oscillator circuit is deactivated during at least one part of the second operating mode to reduce the current consumption.

According to one embodiment, the circuit for managing clock signals is arranged for waking up the secondary oscillator circuit and deactivating the main oscillator circuit upon the wake-up of the central processing unit and during the second operating mode.

According to one embodiment, the integrated circuit comprises means for going from the second operating mode with reduced current consumption to the first operating mode at full power.

According to one embodiment, the circuit for managing clock signals is arranged for waking up the main oscillator circuit, deactivating the secondary oscillator circuit and applying the first clock signal to the central processing unit, so as to go from the second operating mode to the first operating mode.

According to one embodiment, the integrated circuit comprises means for going from the first operating mode, to the second operating mode, without deactivating the central processing unit.

According to one embodiment, the circuit for managing clock signals is arranged for simultaneously waking up the main and secondary oscillator circuits and for applying the second clock signal to the central processing unit so as to have a third operating mode of transition between the first two operating modes during a stabilization time interval.

According to one embodiment, the circuit for managing clock signals comprises a switch circuit for supplying, either the first clock signal, or the second clock signal, at the clock signal input of the central processing unit and a control circuit comprising means for waking up/deactivating the main oscillator circuit, means for waking up/deactivating the secondary oscillator circuit and means for actuating the switch circuit so as to send the first or the second clock signal to the central processing unit.

According to one embodiment, the circuit for managing clock signals comprises a clock output and is arranged for having a first switch state, in which the management circuit supplies the first clock signal at the clock output, a second switch state in which the management circuit supplies the second clock signal at the clock output and a transient state between the first state and the second state, in which the management circuit does not supply any clock signal at its clock output, the clock output being set to a determined electric level, so as to avoid interference upon the switch transition between the two clock signals.

According to one embodiment, the circuit for managing clock signals is arranged so that a halt command of the central processing unit interrupts the operating mode in progress and triggers the active halt mode, in which the main and secondary oscillator circuits are deactivated and no clock signal is sent.

According to one embodiment, the circuit for managing clock signals is arranged for performing a reconfiguration operation, when a halt command is applied while the first clock signal is being applied to the central processing unit, an operation in which the secondary oscillator circuit is awakened and the second clock signal is pre-selected to be applied to the central processing unit, so as to automatically wake itself up in the second operating mode with reduced current consumption at the end of the halt mode.

According to one embodiment, the circuit for managing clock signals is arranged for deactivating the main and secondary oscillator circuits, if and only if a halt command is applied.

According to one embodiment, the circuit for managing clock signals is controlled by a control register of the central processing unit comprising a first flag for waking up the main oscillator circuit, a second flag for waking up the secondary oscillator circuit and a third flag for selecting the transmission of the first or of the second clock signal.

According to one embodiment, the control register further comprises a flag controlled by a counter of stabilization cycles that is active during the third operating mode.

According to one embodiment, the secondary oscillator circuit has reduced current consumption relative to the main oscillator circuit.

According to one embodiment, the secondary oscillator circuit has a negligible stabilization time relative to the main oscillator circuit.

According to one embodiment, the secondary oscillator circuit is of resistance capacitance type.

BRIEF DESCRIPTION OF THE SEVERAL VIEWS OF THE DRAWING(S)

These and other objects, characteristics and features of the present invention shall be explained in greater detail in the following description of an example of an embodiment of a microprocessor according to the present invention, given in relation with, but not limited to the following figures.

DETAILED DESCRIPTION OF THE INVENTION

Figure 2:
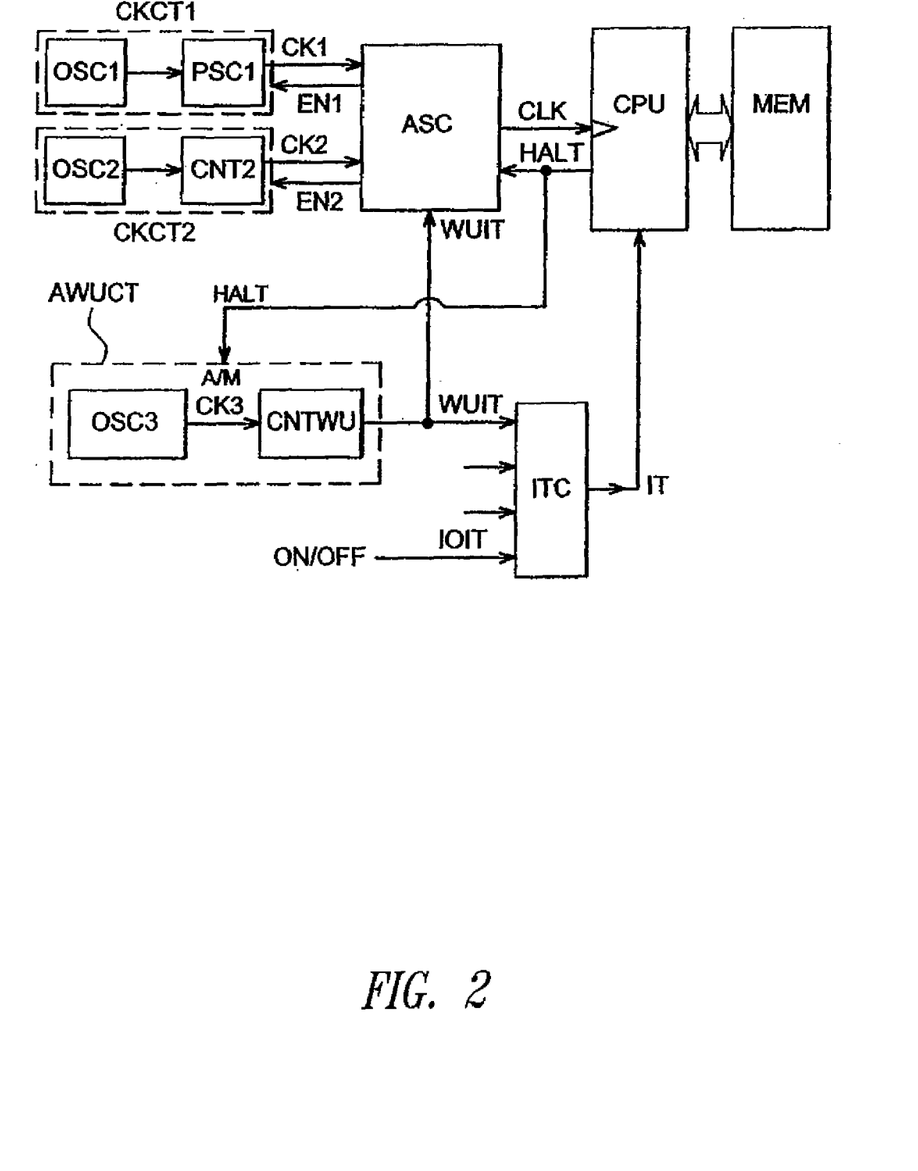
FIG. 2 represents a structural diagram of the oscillator circuits and of the circuit for managing clock signals of a microprocessor according to the present invention.

FIG. 2 is a general diagram, in block form, of the structure of a microprocessor according to the present invention. The microprocessor comprises a first clock circuit CKCT1, a second clock circuit CKCT2 and a circuit for managing clock signals ASC.

The microprocessor classically comprises an automatic wake-up circuit AWUCT supplying, at regular time intervals, a wake-up interrupt signal WUIT applied to an interrupt control circuit ITC that sends an interrupt signal IT to the CPU, as described above in relation with FIG. 1.

The first clock circuit CKCT1 comprises, in a similar way to the circuit in FIG. 1, an oscillator OSC1 followed by a divider circuit PSC1 that delivers a first clock signal CK1 of frequency corresponding to the nominal working frequency of the CPU. This main clock circuit preferably comprises a quartz oscillator, which is suitable for obtaining high values of frequency and of precision. In return for its precision, this main oscillator OSC1 has a considerable stabilization time representing between one hundred and several tens of thousands of periods of the clock signal it generates.

The second clock circuit CKCT2 comprises an oscillator circuit OSC2 linked to a counting circuit CNT2 for delivering a second clock signal CK2 of much lower frequency than the nominal working frequency of the CPU that corresponds to the frequency of the first clock signal CK1. This circuit CKCT2 preferably comprises an oscillator OSC2 with low current consumption and that does practically not require any stabilization time to establish the regular oscillations of the second clock signal CK2. The secondary clock circuit CKCT2 comprises for example an oscillator circuit of RC type, with resistance and capacitance, or a ring oscillator circuit, formed by several inverting gates connected in series looped onto itself.

The first clock signal CK1 of high frequency and the second clock signal CK2 of reduced frequency are applied to two inputs of the circuit for managing clock signals ASC that delivers at output a clock signal CLK applied to the CPU to clock its operation. The signal HALT delivered by the CPU for controlling the start-up A/M of the automatic wake-up circuit AWUCT, is applied at the same time to the clock management circuit ASC. The time base pulse signal WUIT coming from the automatic wake-up circuit AWUCT is sent to the circuit ASC. It is the clock management circuit ASC that controls the operation of the two main OSC1 and secondary OSC2 oscillator circuits by respectively delivering a first wake-up control signal EN1 to the first clock circuit CKCT1 and a second wake-up control signal EN2 to the second clock circuit CKCT2.

In operation, the clock signal management circuit ASC receives the control signal HALT from the CPU along with the wake-up signal WUIT and is responsible for waking up (EN1/EN2) the primary clock circuit CKCT1 and/or the secondary clock circuit CKCT2 and for selecting one of the two clock signal sources CK1/CK2 to apply it as a clock signal CLK to the CPU so as to clock the operations.

The clock management circuit ASC allows several operating modes to be implemented in a microprocessor according to the present invention.

Figure 3:
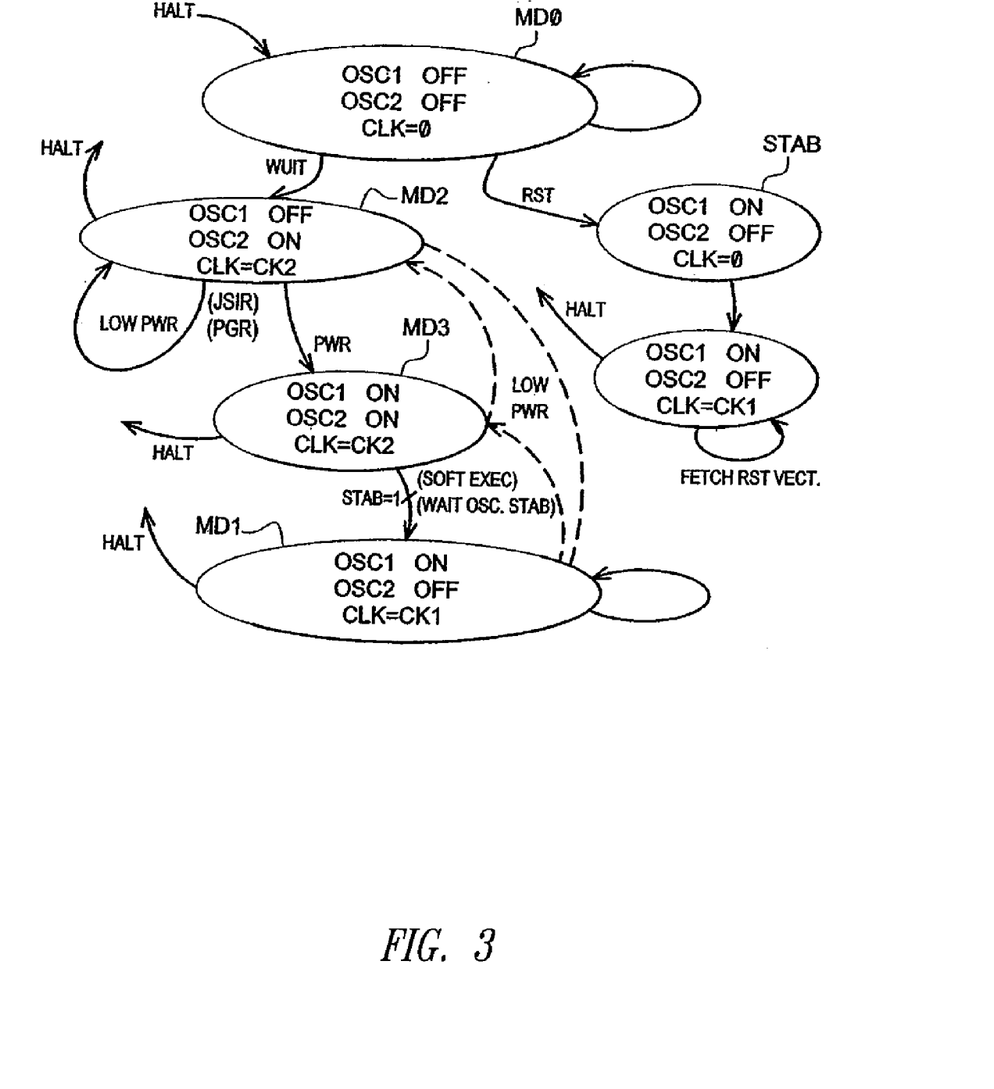
FIG. 3 represents a diagram of the operating states and of the commands of the circuit for managing clock signals in the microprocessor, according to the present invention.
Figure 4:
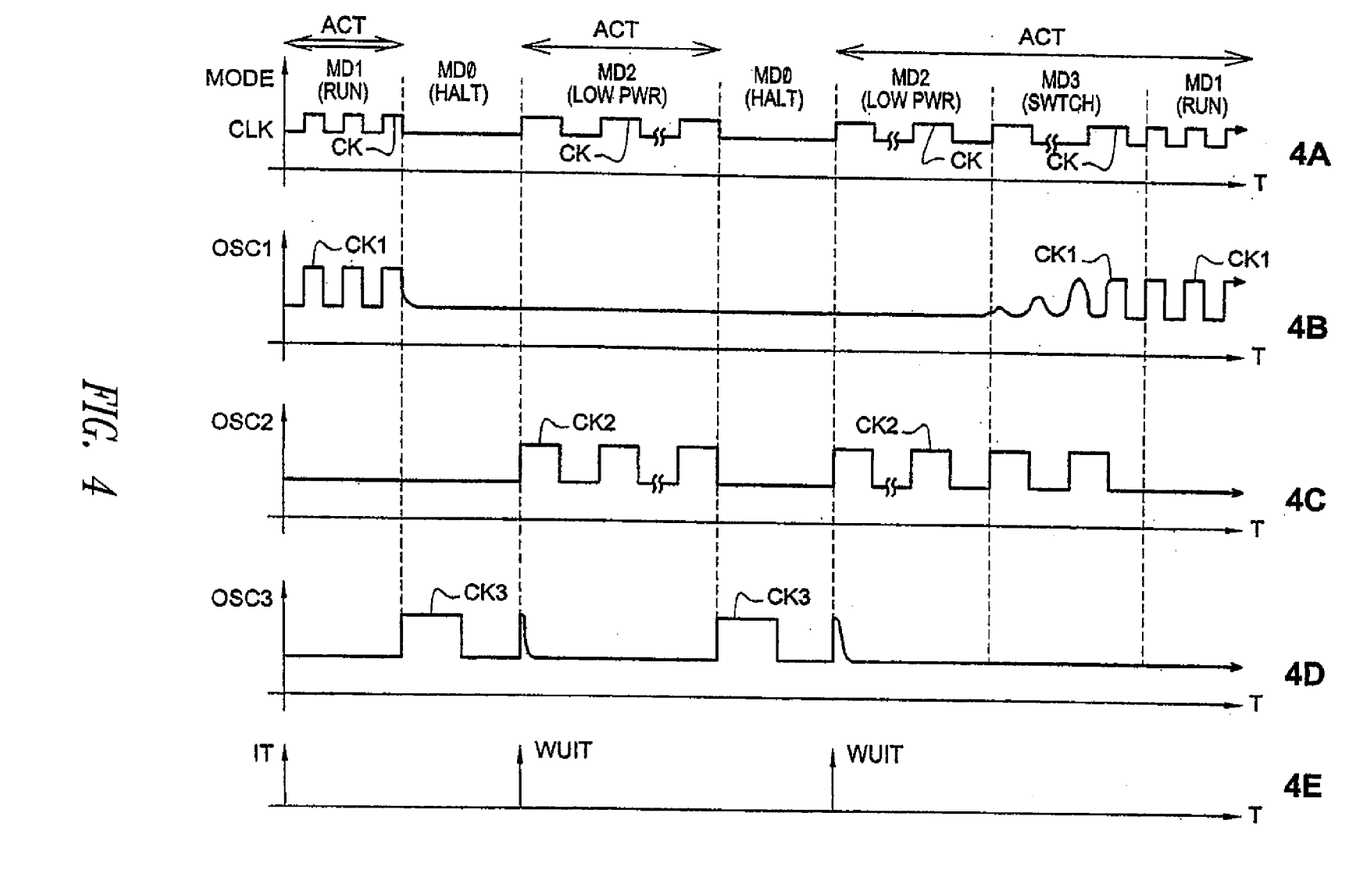
FIGS. 4A to 4E represent timing diagrams of clock and wake-up signals within the scope of the operating modes of the microprocessor, according to the present invention.

The various operating modes implemented according to the present invention and the transitions between these modes appear on the state diagram in FIG. 3 and on the timing diagrams in FIG. 4.

When the microprocessor encounters an instruction HALT during the execution MD1 of its application program, it goes into the operation halt mode MD0 that corresponds to a classical mode HALT. As detailed in FIG. 3, in the mode MD0, the clock management circuit ASC deactivates both the primary oscillator OSC1 and the secondary oscillator OSC2, such that there is no clock signal applied to the CPU (CLK=0). The consumption of the microprocessor is then practically zero, the CPU and all the peripheral circuits, including the clock generation circuits CKCT1 and CKCT2, being stopped, except for the automatic wake-up circuit AWUCT.

In the event of an interrupt IT in the mode MD0, particularly upon the internal interrupt WUIT marking the end of the automatic wake-up regular time interval, the microprocessor goes into an operating mode MD2 with low current consumption (LOW PWR).

In the mode MD2, the primary oscillator OSC1 remains deactivated (EN1=0), the clock management circuit ASC only waking up the secondary oscillator OSC2 (EN2=1). The circuit ASC then sends the second clock signal to the clock input of the CPU (CLK=CK2) as shown in the diagram in FIG. 4. The operation of the CPU is therefore reactivated. In mode MD2, the operation of the CPU is therefore clocked to the reduced frequency of the second clock signal CK2, a lower frequency than the nominal working frequency of the CPU. As the frequency of the operations of the CPU is the essential factor of current consumption of a microprocessor, the mode MD2 advantageously offers reduced current consumption relative to the operation at the nominal frequency. The overall current consumption of the microprocessor in the operating mode MD2 is further reduced by the fact that the main oscillator OSC1, a high consumer, remains switched off, while the secondary oscillator, the only one active, is advantageously an oscillator with low current consumption.

After the wake-up of the CPU in the mode MD2, the latter is able to perform a routine to check the state of the inputs/outputs and to find out whether there are any operations to be performed.

If there are no operations to be performed, the CPU can immediately return to the mode HALT to save all unjustified current consumption. In a particularly advantageous manner according to the present invention, the microprocessor in the operating mode MD2 can, at the same time:

start the checking routine as soon as the CPU is awakened at the end of the mode HALT, without waiting for any stabilization time, since the secondary oscillator OSC2 does not require any stabilization time;

perform the checking routine at the reduced frequency of the second clock signal, thus with low current consumption;

check as soon as possible if there are no operations to be performed; and, as applicable, immediately return to the mode HALT, while saving the current consumption to the maximum when there are no operations to be performed.

If this is not the case, the CPU in the operating mode MD2 performs a branching to an interrupt handling routine JSIR or to an adequate program routine PGR for performing the operations.

The branching routine indicates whether the instructions must be processed at full power (PWR) or at reduced power (LOW PWR).

When the processing does not require the nominal power (LOW PWR), the CPU remains in the operating mode MD2 in which the clock management circuit ASC only wakes up the secondary oscillator and sends the second clock signal to the CPU (CLK=CK2) to clock the operation to the reduced frequency of the signal CK2.

When the processing requires the nominal power (PWR) of the microprocessor, provision is made according to the present invention to activate the operation at full power after a phase of operation in a transition (SWTCH) mode MD3.

In the mode MD3, as represented in FIGS. 3 and 4, the two main and secondary oscillator circuits OSC1-OSC2 are simultaneously awakened by the clock management circuit ASC (EN1=EN2=1). The circuit ASC selects and sends only the second clock signal at clock input of the CPU (CLK=CK2). As a result, in the mode MD3, the operation of the CPU is clocked to the reduced frequency of the second clock signal CK2. During this mode MD3 phase, the state of the main oscillator OSC1 is stabilized, as shown in the diagram in FIG. 4. During the transient operating mode MD3, the CPU continues to execute the program instructions (SOFT EXEC.) at the reduced frequency CK2, while waiting for the end of the stabilization time of the main oscillator OSC1.

Thus, in a particularly advantageous manner, the new operating mode MD3 allows the CPU to perform operations during the stabilization time of the main oscillator OSC1, and thus to avoid idle times during this phase.

When the time required to wait for the steady state has elapsed (STAB=1), the operation goes into the mode MD1, corresponding to a normal operating mode RUN at the nominal power (PWR).

In mode MD1, as detailed in FIGS. 3 and 4, the clock management circuit ASC maintains the wake-up (EN1=1) of the main oscillator OSC1, while the secondary oscillator OSC2 is deactivated (EN2=0). The circuit ASC sends the first clock signal to the clock input of the CPU (CLK=CK1). Therefore in the mode MD1, the operation of the CPU is clocked to the nominal frequency of the clock signal CK1, thus at full power.

The normal operation further to the command HALT of the microprocessor according to the present invention thus comprises a sequence of operating modes as follows:

a halt (HALT) cycle MD0 in which the circuit ASC deactivates all the clock circuits and thus the operation of the CPU;

a new operating mode MD2 with reduced current consumption (LOW PWR) that starts as of the end of the mode HALT with the wake-up of the secondary oscillator OSC2 and of the CPU, the operation of the CPU being clocked to the reduced frequency of the second clock signal CK2;

if the CPU needs to perform operations at the pace of the normal operating mode RUN at full power, the clock management circuit ASC implements a transient operating mode MD3 in which the two clock circuits CKCT1 and CKCT2 are awakened; the second clock signal CK2 continues to be applied to the CPU to maintain its operation at the reduced frequency CK2, the time it takes for the stabilization time STAB of the first clock signal CK1 of higher frequency to end;

In this case, once the stabilization time (STAB=1) has ended, the circuit goes into the operating mode MD1 at the nominal power (RUN), in which only the main oscillator OSC1 remains active (EN1=1). The circuit ASC deactivates (EN2=0) the secondary oscillator OSC2 and sends the first clock signal CK1 to the CPU to clock its operation to the higher frequency of the signal CK1 corresponding to the nominal operating power of the CPU.

The CPU can, during each of these operating modes MD2, MD3 and MD1, return to the mode MD0 as soon as it encounters an operation halt instruction HALT, that is when there are no longer any program instructions to be performed.

Furthermore, it is possible according to the present invention, to return directly from the operating mode MD1 at full power (RUN) to the operating mode MD2 at reduced power (LOW PWR), without going through the halt mode MD0, when the CPU goes into an application program that is executable at reduced power (LOW PWR), as indicated by a dotted line in FIG. 3.

The right-hand side of the diagram in FIG. 3 indicates the possibility of reactivating the operation of the CPU in a classical manner, in the event of reset RST during the halt mode MD0. The reset RST may be caused by an interrupt (IOIT) of external origin (ON/OFF) or by an interrupt (IT) of internal origin different from the wake-up signal WUIT. In this case RST, the procedure involves only waking up the main oscillator OSC1, then waiting for the stabilization cycle STAB to end, before applying the first clock signal CK1 to the CPU to start its operation MD1 at full power (RUN).

Figure 5:
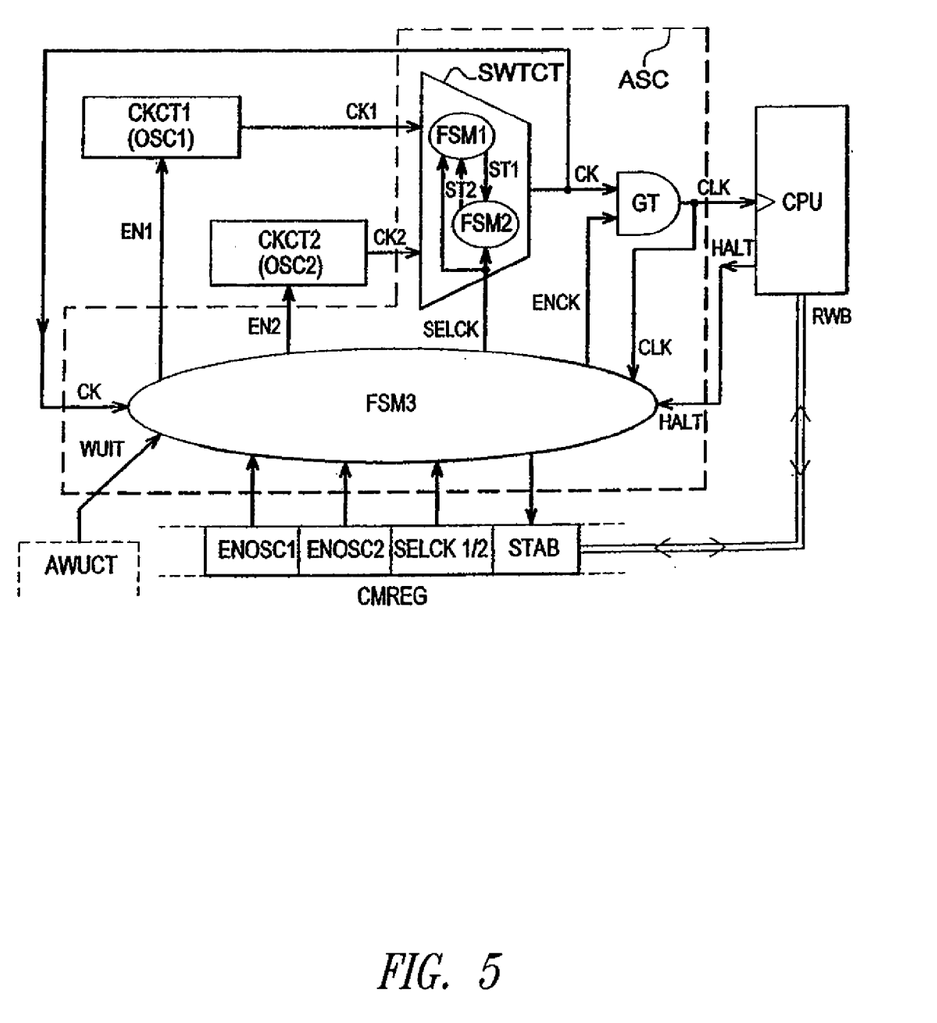
FIG. 5 represents a schematic diagram of the circuit for managing clock signals with the control signals of the oscillator circuits provided in the microprocessor, according to the present invention.

FIG. 5 represents a schematic diagram of an embodiment of the circuit for managing the clock signals ASC that manages the wake-up of the clock circuits CKCT1/CKCT2 and controls the implementation of these operating modes MD0, MD1, MD2, MD3 under the control of the CPU.

The clock management circuit ASC comprises an automatic switch block SWTCT comprising two state logic circuits FSM1 and FSM2 under the control of a control block FSM3. These functions are preferably produced in the shape of a hard-wired logic circuit using the state diagrams in FIGS. 3-6-8 in a manner well known by those skilled in the art.

The control block FSM3 is controlled by the CPU through a mode control register CMREG and the signal HALT. The control block FSM3 receives the wake-up signal WUIT of the circuit AWUCT that determines the end of the mode HALT.

The control block FSM3 supplies a respective wakeup signal EN1 and EN2 to each of the two clock circuits CKCT1 and CKCT2 that in turn respectively generate the first and the second clock signals CK1 and CK2, which are applied to two respective inputs of the automatic switch block SWTCT.

The control block FSM3 delivers a clock select signal SELCK to the block SWTCT to change switch state FSM1/FSM2 and to send at output CK a clock signal selected out of the signals CK1 and CK2. The selected clock signal CK is applied to one input of a logic AND gate GT. The logic gate GT receives at a second input a command ENCK from the block FSM3 and its output is applied at clock input CLK of the CPU. The clock signals CK and CLK are sent to the control block FSM3 to synchronize and check the changes of states.

Each of the two state logic circuits FSM1, FSM2 respectively receives a clock signal CK1, CK2 at input and manages the transmission of the respective clock signal CK1, CK2 to the common output CK. The function of the first logic circuit FSM1 is to authorize or inhibit the transmission of the first clock signal CK1 at output CK. The function of the second logic circuit FSM2 is to inhibit or to authorize the transmission of the second clock signal CK2 at output CK.

Figure 6:
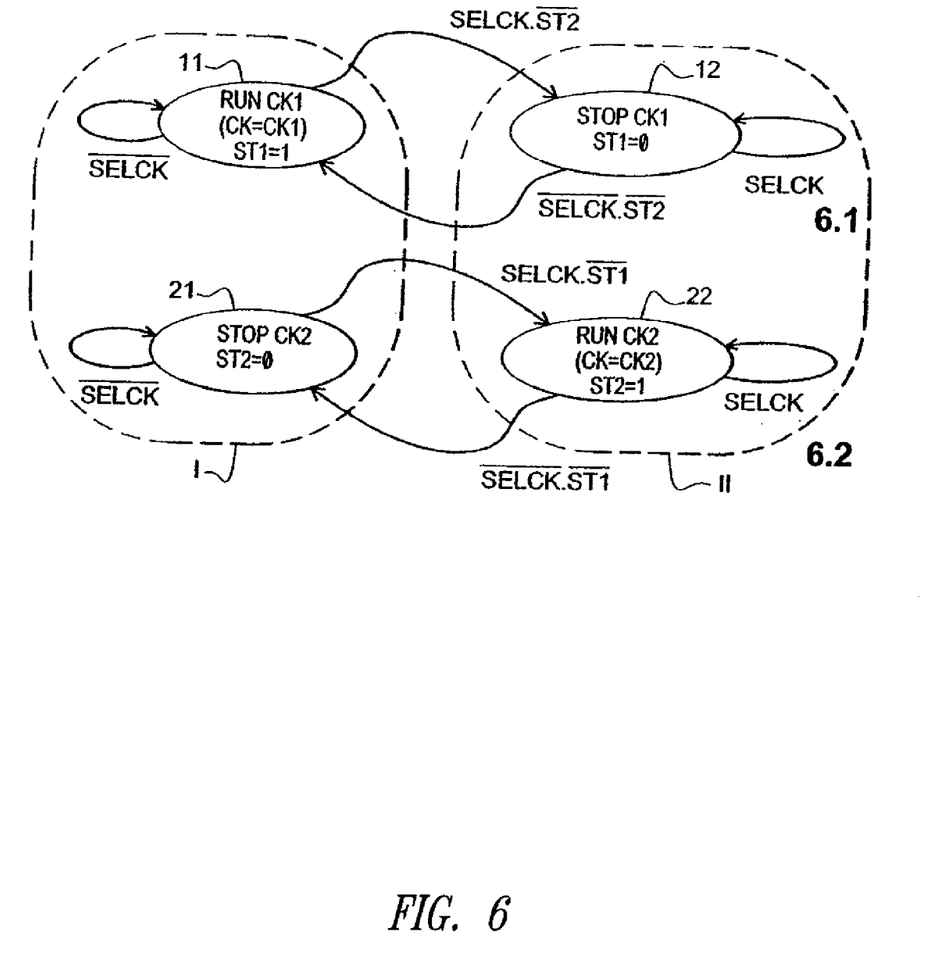
FIG. 6 has two subparts, 6.1 and 6.2 which represent two diagrams of the operating states and of the transitions of states of two logic circuits of a clock signal switch block, provided in the clock management circuit, according to the present invention.

FIG. 6 is a state diagram of one advantageous example of the operating mode of the automatic switch block SWTCT that comprises two similar state logic circuits FSM1 and FSM2, respectively represented in FIGS. 6.1 and 6.2.

FIG. 6.1 represents the two operating states 11 and 12 of the logic circuit FSM1.

In the first state 11, the circuit FSM1 delivers the signal CK1 by activating the transmission of the first clock signal (CK=CK1) to the output of the circuit SWTCT. In this active state 11, the circuit FSM1 transmits a signal ST1 of logic level 1 bound for the second circuit FSM2. The first circuit FSM1 remains in the active state 11 when the clock select signal SELCK transmitted by the control circuit FSM3 is on the level 0 (logic condition /SELCK).

When the select signal SELCK goes to the level 1, the first circuit FSM1 can go from the first state 11 to the second state 12, according to the conditions of transitions that will be reviewed and detailed subsequently.

In the second state 12, the circuit FSM1 interrupts the transmission of the first clock signal (STOP CK1) and does not deliver any signal at the output CK. In this deactivated state 12, the signal ST1 sent by the circuit FSM1 to the circuit FSM2 is on the level 0. The first circuit FSM1 remains in the deactivated state 12 when the select signal SELCK is on the level 1 (condition SELCK).

FIG. 6.2 represents the two operating states 21 and 22 of the second logic circuit FSM2.

In the first state 21, the circuit FSM2 deactivates the transmission of the second clock signal (STOP CK2) and does not deliver any signal at the output CK. In this deactivated state 21, the circuit FSM2 supplies a signal ST2 of level 0 intended for the first circuit FSM1. The second circuit FSM2 remains in the deactivated state 21 when the clock select signal SELCK transmitted by the control block FSM3 is on the level 0 (condition /SELCK).

The second circuit FSM2 goes from the state 21 to the state 22 when the signal SELCK is on the level 1 and the signal ST1 is on the level 0, corresponding to the inactive state 12 of the first circuit FSM1 (logic condition SELCK AND /ST1).

In the second state 22, the second circuit FSM2 delivers the signal CK2 by activating the transmission of the second clock signal at the common output (CK=CK2). Simultaneously, in this active state 22, the circuit FSM2 activates the signal ST2 on the level 1 bound for the first circuit FSM1. The second circuit FSM2 remains in the active state 22 when the clock select signal SELCK transmitted by the control block FSM3 is on the level 1 (condition SELCK).

The transitions of states of the circuits FSM1 and FSM2 are performed according to the table of the following logic conditions:

- the circuit FSM1 remains in the active state 11 while the clock select signal SELCK transmitted by the circuit FSM3 is on the level 0 (logic condition /SELCK);
- the circuit FSM1 goes from the active state 11 to the deactivated state 12 when the signal SELCK is on the level 1 and the signal ST2 is on the level 0, corresponding to the inactive state of the second circuit FSM2 (condition SELCK AND /ST2);
- the circuit FSM1 remains in the deactivated state 12 while the signal SELCK is on the level 1 (condition SELCK);
- the circuit FSM1 returns from the deactivated state 12 to the active state 11 when the signal SELCK is on the level 0 and the signal ST2 is on the level 0, corresponding to the inactive state 21 of FSM2 (logic condition /SELCK AND /ST2);
- the second circuit FSM2 remains in the deactivated state 21 while the signal SELCK is on the level 0 (/SELCK);
- the circuit FSM2 goes from the deactivated state 21 to the active state 22 when the signal SELCK is on the level 1 and the signal ST1 is on the level 0, corresponding to the deactivated state of the circuit FSM1 (condition SELCK AND /ST1);
- the circuit FSM2 remains in the active state 22 while the signal SELCK is on the level 1 (condition SELCK); and
- the circuit FSM2 returns from the active state 22 to the deactivated state 21 when the signal SELCK is on the level 0 and the signal ST1 is on the level 0, corresponding to the deactivated state 12 of FSM1 (logic condition/SELCK AND /ST1).

Therefore, while the signal SELCK is on the level 0, the two circuits FSM1 and FSM2 remain in their first state 11 and 21, respectively, i.e., the active state 11 for FSM1 and the deactivated state 21 for FSM2. In a complementary manner, while the signal SELCK remains on the level 1, the two circuits FSM1 and FSM2 remain in their second state 12 and 22 respectively, i.e., the deactivated state 21 for FSM1 and the active state 22 for FSM2.

The two circuits FSM1 and FSM2 therefore have closely linked operating modes, since they depend on the signals ST1 and ST2 exchanged between themselves, these signals ST1 and ST2 indicating their respective operating state.

Table I below recapitulates the changes of states of the circuits FSM1 and FSM2 of the switch block SWTCT, indicating which is the final state of the circuits FSM1 and FSM2 (new state) according to the initial state of the circuits FSM1 and FSM2, and the value of the signals ST1, ST2 and CK corresponding to these states.

TABLE I

STATES OF THE SWITCH CIRCUIT FSM1–FSM2

| INITIAL STATE | | | | | COMMAND FSM3 | NEW STATE | | | |
|---|---|---|---|---|---|---|---|---|---|
| FSM1 | FSM2 | CK | ST1 | ST2 | SELCK | FSM1 | FSM2 | CK | OBSERVATIONS |
| RUN (11) | STOP (21) | CK1 | 1 | 0 | 0 | RUN (11) | STOP (21) | CK1 | Stationary (Position I) |
| | | | | | 1 | STOP (12) | STOP (21) | 0 | Unstable state |
| STOP (12) | STOP (21) | 0 | 0 | 0 | 0 | RUN (11) | STOP (21) | CK1 | Change to Position I |
| | | | | | 1 | STOP (12) | RUN (22) | CK2 | Change to Position II |
| STOP (12) | RUN (22) | CK2 | 0 | 1 | 0 | STOP (12) | STOP (21) | 0 | Unstable state |
| | | | | | 1 | STOP (12) | RUN (22) | CK2 | Stationary (Position II) |
| RUN (11) | RUN (22) | CK1 + CK2 | 1 | 1 | 0 | RUN (11) | RUN (21) | CK1 + CK2 | State inhibited (blocked) |
| | | | | | 1 | RUN (11) | RUN (21) | CK1 + CK2 | (conflict CK) |

The switch block SWTCT that contains these two logic circuits FSM1 and FSM2 with two states, thus forms a system with four states 11, 12, 21, 22 and with four combinations of states 11-21, 12-21, 12-22 and 11-22.

Yet, in fact, as the operation of the circuits FSM1 and FSM2 is linked, globally, the switch block SWTCT only has two combinations of stable states in operation, the positions I and II, the other combinations of states being transient (unstable) or inhibited (blocking).

The first position I appears on the first line of the table and is indicated by a dotted line in FIG. 6. In this positon I, the first circuit FSM1 sends the first clock signal (CK=CK1) and the signal ST1=1, while the second circuit FSM2 does not send any signal. While the signal SELCK is on the level 0, the two circuits FSM1 and FSM2 remain in this stationary state 11-21, in positon I.

If, during this position I, the signal SELCK is set to the level 1, as indicated in the next interline space of the table, the circuit FSM1 interrupts the transmission of the first clock signal (STOP CK1) and deactivates the signal ST1, initially (state 12-21). But this new state is unstable (temporary), as the next part of the table indicates, in the fourth interline space, as the deactivation of the signal ST1 (ST1=0) in turn causes a change of state of the circuit FSM2 from the deactivated state 21 (STOP CK2) to the active state 22 (RUN CK2). The circuits FSM1-FSM2 of the switch block SWTCT therefore switch into a new stationary state 12-22 that constitutes the position II.

The position II is in the sixth interline space of the table and appears encircled by a dotted line on the right-hand side of FIG. 6. In this new stable position II, the first circuit FSM1 does not send any signal (STOP CK1), while the second circuit FSM2 sends the second clock signal (CK=CK2) and the signal ST2=1.

This position II remains stable while the control block FSM3 maintains the select signal SELCK on the level 1.

This position II is aborted when the signal SELCK goes to the level 0 (/SELCK), as the previous interline space of the table indicates. The second circuit FSM2 then interrupts the transmission of the second clock signal (STOP CK2) and deactivates the signal ST2, on the level 0 (state 21), which constitutes a new unstable, temporary state, in which the output CK does not send any clock signal and preferably supplies a zero output signal (CK=0). Indeed, as the third interline space of the table previously indicates, the deactivation of the signal ST2 (ST2=0) in turn causes a change of state of the first circuit FSM1 from the deactivated state 12 (STOP CK1) to the active state 11 (RUN CK1). The block FSM1-FSM2 therefore switches to position I that constitutes a stationary state 11-21, as explained above, with reference to the first line of the table.

Therefore, the automatic switch block SWTCT with two circuits FSM1-FSM2 globally has only two operating modes, the position I and the position II. In the position I, the first circuit FSM1 sends the first clock signal CK1 at output CK, the second circuit FSM2 not sending any signal. This position I is stable while the control signal SELCK is on the level 0 (/SELCK). It is sufficient that the control block FSM3 takes the signal SELCK to the level 1, so that the switch block goes from the position I to the position II after passing through unstable, transient states. In the position II, the second circuit FSM2 in turn sends the second clock signal CK2 at output CK, while the first circuit FSM1 does not send any signal. As soon as the control signal SELCK returns to the level 0, the switch block FSM1-FSM2 returns from the position II to the position I, passing through unstable, transient states.

Advantageously, the automatic switch block SWTCT with two logic circuits FSM1-FSM2 simply has two operating modes I and II, the first I, in which only the first clock signal CK1 is sent at clock signal output CK, the second II, in which only the second clock signal CK2 is sent at clock signal output CK.

Advantageously, as soon as a circuit FSM1 or FSM2 is deactivated and no longer sends the respective clock signal CK1 or CK2, the other circuit FSM2 or FSM1 takes over and automatically reactivates the transmission of the other clock signal CK2 or CK1, respectively.

One considerable advantage of the clock signal automatic switch block SWTCT implemented according to the present invention, is that upon the switches between the two operating modes I and II, the circuits FSM1-FSM2 fleetingly pass through transient states, in which no clock signal is sent, which avoids glitches on the output signal CK and allows for a perfect transition between the clock signals CK1 and CK2 (and reciprocally between CK2 and CK1).

Figure 7:
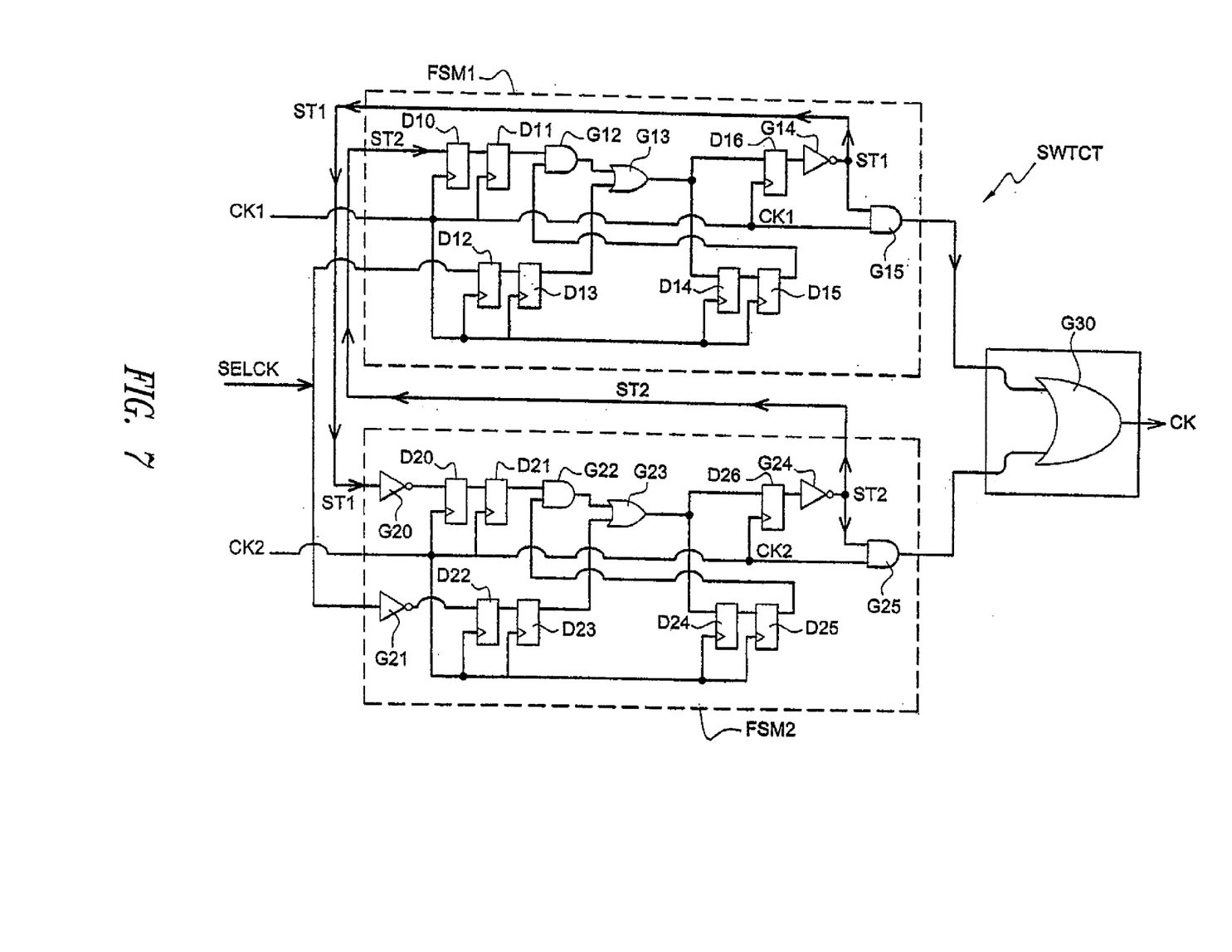
FIG. 7 represents, in the form of a wiring diagram, an example of an embodiment of the logic circuits forming a clock signal switch block, according to the present invention.

FIG. 7 gives an example of a detailed embodiment in the form of an electronic wiring plan of circuits FSM1 and FSM2 with logic gates and latches, which performs the functions, the states and the operating modes described above in relation with the state diagram in FIG. 6, table I of the switch states and the description of the operation of the circuits FSM1-FSM2 of the automatic switch block SWTCT of clock signals CK1/CK2.

The circuit FSM1 receives the signals CK1 and SELCK at input and delivers the output signal CK and the signal ST1 bound for the second circuit FSM2, the first circuit FSM1 itself receiving the signal ST2 of the second circuit FSM2 as explained above. The circuit FSM1 comprises a series of matching latches of D type D10-D11, D12-D13, D14-D15, D16 and a series of logic gates G12, G13, G14, G15 corresponding to operations of logic AND, logic OR type, of inverting gate or AND gate, accordingly.

The circuit FSM2 is practically identical to the circuit FSM1 and comprises a series of pairs of latches D20-D21, D22-D23, . . . and a series of logic gates G22, G23, . . . that are identical and wired in an identical manner to the latches D10-D11, D12-D13, . . . and to the logic gates G12, G13, . . . of the circuit FSM1, except for two supplementary inverting gates G20 and G21. The inverting gate G21 is arranged on the line of the control signal SELCK and the inverting gate G20 is arranged on the line of the signal ST1, such that the circuit FSM2 has an operating mode complementary to that of the circuit FSM1, as indicated above with regard to the state diagrams 6.1 and 6.2 in FIG. 6.

The two outputs of the circuits FSM1 and FSM2 are linked together at two respective inputs of a logic OR gate G30, the output of which supplies the signal CK. Advantageously, the output signal CK has a zero level (CK=0) when the two circuits FSM1 and FSM2 are deactivated (transient states 12-21) and do not send any clock signal, neither CK1, nor CK2.

The diagram in FIG. 7 easily allows those skilled in the art to comprehend the details of the practical embodiment and of the operative operating modes of this electronic circuit that will not be detailed further herein.

Other forms of embodiment of equivalent electronic circuits performing the functions, the logic states and the operating modes explained above in relation with the state diagrams in FIG. 6 can easily be obtained by those skilled in the art using VHDL type circuit design software, commonly used in the field, without having to go into these embodiments in detail here.

Now, the operation of the block FSM3 that controls the select signals SELCK, ENCK of the circuits FSM1, FSM2 of the switch block SWTCT, and the wake-up signals EN1 and EN2 of the first and of the second clock circuits CKCT1 and CKCT2 will be detailed with reference to the diagrams in FIGS. 5 and 8.

FIG. 5 shows that the CPU controls the block FSM3 through an operating mode control register CMREG containing flags ("flags") ENOSC1, ENOSC2, SELCK1/2 and STAB the functions of which will be detailed subsequently.

The circuit FSM3 supplies the wake-up signals EN1, EN2 and the select signals SELCK, ENCK of the clock signals CK1, CK2, CK, according to the content of the flags ENOSC1, ENOSC2, SELCK1/2 of the register CMREG and according to the control signal HALT and to the wake-up signal WUIT.

In normal operating mode, provision has been made for the control signals EN1, EN2, SELCK and ENCK of the circuit for managing clock, signals to be under the control of the application program embedded by the user in the microprocessor. The state of the commands EN1, EN2, SELCK and ENCK then essentially depends on the flags ENOSC1, ENOSC2, SELCK1/2 and STAB of the register CMREG.

On the other hand, in the mode HALT, the operation of the CPU is stopped, and the circuit FSM3 autonomously controls the wake-up EN1, EN2 and select SELCK, ENCK signals. In halt mode, the control signals EN1, EN2, SELCK and ENCK are essentially determined by the halt command HALT and the wake-up signal WUIT received by the circuit FSM3 so as to automatically reactivate the operation of the CPU.

Figure 8:
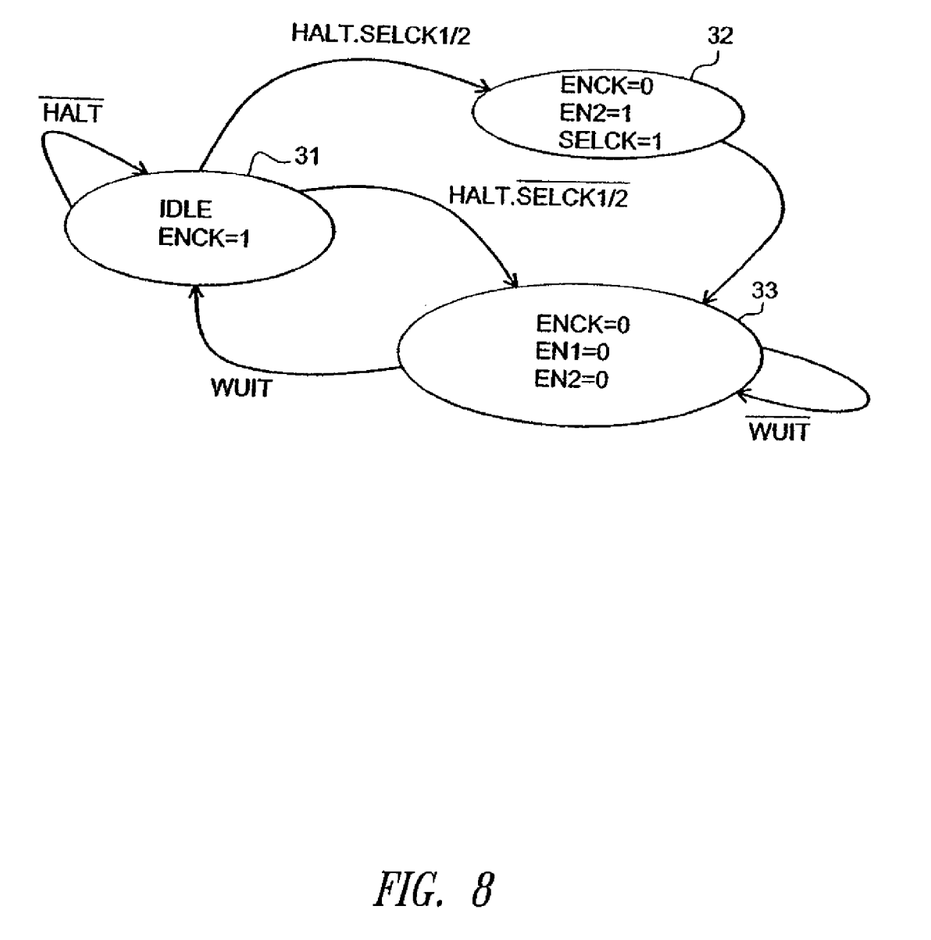
FIG. 8 represents a diagram of the operating modes and of the transitions of states of a control block of the circuit for managing clock signals provided by the present invention.

FIG. 8 represents a state diagram of the block FSM3 concerning more particularly the transitions of states of the commands EN1, EN 2, SELCK and ENCK of the block FSM3 when the deactivation command HALT and the periodic wake-up signal WUIT occur.

Initially, in the state 31, in a normal operating stage, commonly called IDLE, the outputs EN1, EN2 and SELCK closely reproduce the commands of the flags ENOSC1, ENOSC2 and SELCK1/2 applied by the CPU to manage the various operating modes MD1, MD2, MD3 as detailed subsequently. During the operating stage IDLE the block FSM3 delivers a signal ENCK authorizing the transmission of the selected clock signal CK1/CK2 to the clock input CLK of the CPU.

When the command HALT occurs while the selected clock signal CK corresponds to the signal CK2 of the secondary oscillator OSC2 (/SELCK1/2, i.e., SELCK1/2=0), the block FSM3 immediately deactivates, in the step 33, the transmission of the clock signal (ENCK=0), the first clock circuit CKCT1 (EN1=0) and the second clock circuit CKCT2 (EN2=0).

When the command HALT occurs while the selected signal CK corresponds to the first clock signal CK1 of the main oscillator OSC1 (SELCK1/2=1), the block FSM3 goes through a reconfiguration step 32 before returning to the step 33. In this intermediate step 32, the transmission of the clock signal CK is deactivated (ENCK=0), the oscillator OSC2 of the second clock circuit CKCT2 is awakened (EN2=1) and the second clock signal CK2 coming from this circuit CKCT2 is preselected (SELCK=1). As soon as the switch of the output CK of the circuit SWTCT onto the second clock signal CK2 is obtained, the block FSM3 goes to the step 33, in which all the signals EN1, EN2 and ENCK are set to the level 0 to deactivate the two clock circuits CKCT1 and CKCT2 and the transmission of the signal CK.

The block FSM3 remains in this state 33 while there is no wake-up signal WUIT (condition /WUIT).

When the circuit AWUCT delivers the wake-up interrupt signal WUIT, the control block returns to the initial step 31 that corresponds to the normal operating stage IDLE when there is no command HALT (condition /HALT, i.e., HALT=0).

In the normal operating mode IDLE, the state of the wake-up signals EN1, EN2 and of the switch signal SELCK substantially corresponds to the state of the flags ENOSC1, ENOSC2 and SELCK1/2 of the register CMREG represented in FIG. 5. Thus, the CPU directly controls the operating mode ordinarily, outside the mode HALT.

A first flag ENOSC1 controls the wake-up of the main oscillator OSC1 through the circuit FSM3 that supplies the wake-up signal EN1 corresponding to the first clock circuit CKCT1.

A second flag ENOSC2 controls the wake-up of the secondary oscillator OSC2 through the circuit FSM3 that supplies the wake-up signal EN2 of the second clock circuit CKCT2.

By convention here, a level 1 on the signals ENOSC1, ENOSC2, EN1, EN2 and ENCK corresponds to an active state and to the effective wake-up of the corresponding circuit CKCT1, CKCT2 and GT.

A third flag SELCK1/2 controls the clock signal source selected out of the clock signals CK1 and CK2, to supply the signal CK, by acting on the block FSM3 that controls the select signal SELCK applied to the circuits FSM1-FSM2 of the switch block SWTCT. In the present example, the levels of the states of the flag SELCK1/2 and of the signal SELCK are inverted. The level 1 of the flag SELCK1/2 controls the selection of the first clock signal CK1, which corresponds to a signal SELCK of level 0 so that the circuit FSM1 wakes up in the state 11 (position I) in which the signal CK1 is sent to the output CK. Conversely, the level 0 of the flag SELCK1/2 controls the selection of the second clock signal CK2, which corresponds to a signal SELCK of level 1 so that the circuit FSM2 goes into the state 22 (CK=CK2).

The flags ENOSC1, ENOSC2 and SELCK1/2 are at least write accessible by the CPU.

Finally, a fourth flag STAB, read accessible by the CPU, indicates when the time of the stabilization process has ended. The content of the indication flag STAB is loaded by a pulse counter (not represented) clocked by the second clock signal CK2. The counter is reset and the content of the flag STAB is set back to 0 when one of the oscillators OSC1 or OSC2 is stopped. The flag STAB is maintained on the level 0 while the first oscillator OSC1 is deactivated during the operating mode MD2 (cf. FIG. 3) then remains on the level 0 in the mode MD3 while the value of the counter is incremented. As soon as the value of the counter reaches a fixed number of cycles CK2 determining the duration of the stabilization time, the counter sets the flag STAB to the level 1, such that the circuit can go to the operating mode MD1 (RUN) as represented in FIG. 3.

Table II below details the operating modes and the states of the signals delivered by the control block FSM3 according to the state of the flags of the register CMREG controlled by the CPU in normal operation IDLE.

Provision is made so that the circuit of the register CMREG does not authorize the CPU to simultaneously set the flags ENOSC1 and ENOSC2 to the level 0. As appropriate, the register CMREG keeps the former values X of the flags ENOSC1 and ENOSC2, such that at least one of the flags ENOSC1 and/or ENOSC2 is on the level 1. This set point allows one of the two oscillators OSC1 or OSC2 to be awakened automatically when the CPU wakes up at the end of mode HALT.

On the other hand, in the mode HALT precisely, as explained above with regard to the step 33 in FIG. 8, the control circuit FSM3 sets the two signals EN1 and EN2 to the level 0, which effectively deactivates the two oscillators OSC1 and OSC2 simultaneously, even if at least one of the flags ENOSC1, ENOSC2 keeps a set point of level 1. The CPU does not then receive any clock signal CLK (CK=0) and its operation is stopped.

At the end of the mode HALT triggered by the interrupt WUIT or RST, the circuit FSM3 therefore finds the set point value of the flags ENOSC1 and ENOSC2 again, that was kept in the register CMREG.

Table II indicates the operating modes obtained according to the state of the flags ENOSC1, ENOSC2 and SELCK1/2 of the register CMREG controlled by the CPU, when the latter is active in the normal operating stage IDLE, in the absence of any mode command HALT.

When the register CMREG contains flags ENOSC1 on the level 1 and ENOSC2 on the level 0 and the flag SELCK1/2 is on the level 1, the control block FSM3 only wakes up the first clock circuit CKCT1 (EN1=1, EN2=0) and selects (SELCK=0) the transmission of the first clock signal CK1 to the CPU that then runs at its nominal frequency. The microprocessor is then in the first operating mode MD1 at the nominal power (RUN).

The circuit of the register CMREG prevents a clock signal (SELCK1/2) from being selected if the corresponding oscillator is not awakened (ENOSC1/ENOSC2).

When the register CMREG contains flags ENOSC1 on the level 0 and ENOSC2 on the level 1 and the flag SELCK1/2 is on the level 0, the control block FSM3 only wakes up the second clock circuit CKCT2 (EN1=0, EN2=1) and selects (SELCK=1) the transmission of the second clock signal CK2 to the CPU, as a result. The microprocessor is then in the second operating mode MD2 with low consumption (LOW PWR).

To change operating mode, the CPU sets the flags ENOSC1 and ENOSC2 to the level 1. The control block FSM3 then wakes up the two clock circuits CKCT1 and CKCT2 (EN1=EN2=1) and maintains the transmission of the second clock signal CK2 (SELCK=1) to the CPU. The microprocessor is then in the third operating mode MD3 of transition between the mode MD2 and the mode MD1. During this transient mode MD3, the bloc FSM3 wakes up

TABLE II

| STATE OF THE FLAGS OF THE CONTROL REGISTER OF THE CPU | | | | OPERATING | SIGNALS OF THE CONTROL BLOCK FSM3 | | | |
| --- | --- | --- | --- | --- | --- | --- | --- | --- |
| ENOSC1 | ENOSC2 | SELCK1/2 | STAB | MODE | EN1 | EN2 | SELCK | CK |
| X | X | X | 0 (RESET) | MD0 (HALT) | 0 | 0 | X | 0 |
| 1 | 0 | 0 (inhibited) 1 | 0 (RESET) | MD1 (RUN) | 1 | 0 | 0 | CK1 |
| 0 | 1 | 0 1 (inhibited) | 0 (RESET) | MD2 (LOW PWR) | 0 | 1 | 1 | CK2 |
| 1 | 1 | 0 | 0 (CNT) | MD3 (SWITCH) | 1 | 1 | 1 | CK2 |
|  |  | 0 | 1 | Change from | 1 | 1 | 1 | CK2 |
|  |  | 1 | 1 | MD3 to MD1 (RUN | 1 | 1 | 0 | CK1 | the counter of the stabilization time (STAB), that has previously been reset.

The state of the flag STAB indicates to the CPU when the count of the stabilization time is reached (STAB=1).

The CPU then modifies the state of the clock (SELCK1/2=1) select flag SELCK1/2. The block FSM3 selects (SELCK=0) the transmission of the first clock-signal CK1 to the CPU. The microprocessor thus goes from the transient mode MD3 to the operating mode MD1 at full power (RUN). To end the change to the mode MD1, the CPU sets the flag ENOSC2 back to the level 0.

The electronic wiring diagram of the logic circuit FSM3 performing these logic states and these operating modes contains in the order of some one hundred logic gates and cannot be explained in detail within the scope hereof.

Forms of embodiments of logic circuits allowing these functions, states and operating modes to be obtained, could be obtained, conventionally, by those skilled in the art, using electronic circuit design software, of VHDL type, commonly used in the field, using the state diagram in FIG. 8 and the table of the control states II.

It will be understood that the state levels 0 or 1 of the control signals and of the flags have only been indicated herein as examples without limitation and it is clear that the circuit according to the present invention can be produced with other combinations of states and of levels of signals.

More generally speaking, although not considered in the description above, the clock management circuit according to the present invention can allow other transitions between the operating modes MD0, MD2, MD3 and MD1.

Therefore, as shown in the diagram by a dotted line in FIG. 3, the CPU can come back from the operating mode MD1 at nominal power to the operating mode MD2 at reduced power, when the processing of the operations does not require all the power of the CPU. This transition from the mode MD1 to the mode MD2 can be done by going back through the transient mode MD3, or even directly and advantageously since the secondary oscillator OSC2 does not require any stabilization time.

Furthermore, according to another alternative, upon the wake-up WUIT at the end of the halt mode HALT MD0, the circuit for managing clock signals can go directly into the operating mode MD3, by simultaneously waking up the two oscillators OSC1 and OSC2, so that the CPU goes into the mode MD1 at full power (RUN) without wasting time after the wake-up.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Other alternatives, embodiments and improvements will be understood by those skilled in the art without departing from the scope of the present invention.

The invention claimed is:

1. An integrated circuit comprising:
a main oscillator circuit supplying a first clock signal;
a peripheral circuit supplying a periodic wake-up signal;
a central processing unit having a first operating mode at full power, in which the first clock signal is applied to the central processing unit; an active halt mode, in which the main oscillator circuit and the central processing unit are deactivated, the central processing unit being awakened by the periodic wake-up signal;
a secondary oscillator circuit adapted to supply a second clock signal of lower frequency than the first clock signal; and
a circuit adapted to manage clock signals being arranged for, upon the wake-up of the central processing unit at the end of the active halt mode, waking up the secondary oscillator circuit and applying the second clock signal to the central processing unit so as to clock the central processing unit to the frequency of the second clock signal and thus obtain a second operating mode with reduced current consumption relative to the first operating mode, the circuit being operable to provide a transient state after waking up the secondary oscillator circuit in which the management circuit does not supply any clock signal at its clock output, the clock output being set to a selected voltage level so as to avoid interference during transitions between being clocked at a first clock signal rate and a second clock signal rate.

2. The integrated circuit according to claim 1 wherein the main oscillator circuit is deactivated during at least one part of the second operating mode to reduce the current consumption.

3. The integrated circuit according to claim 1 wherein the circuit adapted to manage clock signals is arranged for waking up the secondary oscillator circuit and deactivating the main oscillator circuit upon the wake-up of the central processing unit and during the second operating mode.

4. The integrated circuit according to claim 1, comprising means for going from the second operating mode with reduced current consumption to the first operating mode at full power.

5. The integrated circuit according to claim 4 wherein the circuit adapted to manage clock signals is arranged for:
waking up the main oscillator circuit;
deactivating the secondary oscillator circuit;
applying the first clock signal to the central processing unit, so as to go from the second operating mode to the first operating mode.

6. The integrated circuit according to claim 1, comprising means for going from the first operating mode, to the second operating mode, without deactivating the central processing unit.

7. The integrated circuit according to claim 1 wherein the circuit adapted to manage clock signals is arranged for simultaneously waking up the main and secondary oscillator circuits and for applying the second clock signal to the central processing unit so as to have a third operating mode of transition between the first two operating modes during a stabilization time interval.

8. The integrated circuit according to claim 1 wherein the circuit adapted to manage clock signals comprises:
a switch circuit for supplying, either the first clock signal, or the second clock signal, at the clock signal input of the central processing unit; and
a control circuit comprising means for waking up/deactivating the main oscillator circuit, means for waking up/deactivating the secondary oscillator circuit and means for actuating the switch circuit so as to send the first or the second clock signal to the central processing unit.

9. The integrated circuit according to claim 1 wherein the circuit for managing clock signals is arranged so that a halt command of the central processing unit interrupts the operating mode in progress and triggers the active halt mode, in which the main and secondary oscillator circuits are deactivated and no clock signal is sent.

10. The integrated circuit according to claim 1 wherein the circuit for managing clock signals is arranged for deactivating the main and secondary oscillator circuits, if and only if a halt command is applied.

11. The integrated circuit according to claim 1 wherein the circuit for managing clock signals is controlled by a control register of the central processing unit comprising:
a first flag for waking up the main oscillator circuit;
a second flag for waking up the secondary oscillator circuit; and
a third flag for selecting the transmission of the first or of the second clock signal.

12. The integrated circuit according to claim 11 wherein the control register further comprises a flag controlled by a counter of stabilization cycles that is active during a third operating mode.

13. The integrated circuit according to claim 1 wherein the secondary oscillator circuit has reduced current consumption relative to the main oscillator circuit.

14. The integrated circuit according to claim 1 wherein the secondary oscillator circuit has a negligible stabilization time relative to the main oscillator circuit.

15. The integrated circuit according to claim 1 wherein the secondary oscillator circuit is of resistance capacitance type.

16. A circuit comprising:
a central processing unit;
a plurality of clock circuits, each of the clock circuits having a different clock speed and consuming different amounts of power;
a clock management circuit coupled to the central processing unit and to the plurality of clock circuits, the clock management circuit being constructed to receive a plurality of clock signals and to output one of the clock signals to the central processing unit, the clock management circuit including a clock output and being arranged for having the following switch states:
a first switch state, in which the management circuit supplies a first clock signal at the clock output;
a second switch state, in which the management circuit supplies a second clock signal at the clock output; and
a transient state between the first state and the second state, in which the management circuit does not supply any clock signal at its clock output, the clock output being set to a selected voltage level, so as to avoid interference upon the switch transition between the two clock signals; and
a wakeup circuit having a clock wakeup circuit therein, the clock wakeup circuit providing an output which is coupled to both the management circuit and to the CPU for providing a signal to the CPU through a connection other than through the clock management circuit and providing a signal to the clock management circuit.

17. The circuit according to claim 16, further including:
an interrupt decode circuit coupled between the clock wakeup circuit and the CPU for providing a signal from the clock wakeup circuit to the CPU.

18. The circuit according to claim 16 wherein a first clock within the plurality of clocks is a high speed clock for operating the CPU at approximately its highest rated speed; and a second clock of the plurality of clocks being a low speed clock circuit, operating at a substantially slower frequency than the first clock circuit and operating itself and the CPU in a low power mode.

19. The circuit according to claim 18 wherein said second clock circuit reaches a stabilization in fewer cycles of its own clock than the first clock signal reaches a stabilization cycle within cycles of its own clock.

20. A method of operating a circuit comprising:
operating a CPU at a first high frequency provided by a high frequency clock;
halting the operation of the CPU and placing it in a sleep mode;
halting the operation of the high frequency clock for at least a part of the time while the CPU is in sleep mode so that during this time period both the CPU and the high frequency clock are in sleep mode;
awakening the CPU under control of the wakeup clock after the CPU has been in sleep mode for a period of time;
inputting a low frequency clock to the CPU upon its initially waking up from the sleep mode, the low frequency clock having a lower operating frequency and a lower power consumption than the high frequency clock, the CPU operating at the clock rate of the low frequency clock upon initially being awakened from the sleep mode;
performing a check of pending operations at the low clock frequency to determine the number of operations which are pending upon being awakened from the sleep mode;
maintaining operation of the second clock if the number of operations is below a selected numbers; and
turning on the high frequency clock and beginning operation of the CPU at the high frequency clock rate in the event the number of pending operations is higher than the selected number.

21. The method according to claim 20, further including maintaining operation of a wakeup clock while the CPU is in sleep mode.

22. An integrated circuit comprising:
a main oscillator circuit supplying a first clock signal;
a peripheral circuit supplying a periodic wake-up signal;
a central processing unit having a first operating mode at full power, in which the first clock signal is applied to the central processing unit; an active halt mode, in which the main oscillator circuit and the central processing unit are deactivated, the central processing unit being awakened by the periodic wake-up signal;
a secondary oscillator circuit adapted to supply a second clock signal of lower frequency than the first clock signal; and
a circuit adapted to manage clock signals being arranged for, upon the wake-up of the central processing unit at the end of the active halt mode, waking up the secondary oscillator circuit and applying the second clock signal to the central processing unit so as to clock the central processing unit to the frequency of the second clock signal and thus obtain a second operating mode with reduced current consumption relative to the first operating mode, the circuit including a clock output and being arranged for having the following switch states:
a first switch state, in which the management circuit supplies the first clock signal at the clock output;
a second switch state, in which the management circuit supplies the second clock signal at the clock output; and
a transient state between the first state and the second state, in which the management circuit does not supply any clock signal at its clock output the clock output being set to a determined electric level, so as to avoid interference upon the switch transition between the two clock signals.

23. An integrated circuit comprising:
a main oscillator circuit supplying a first clock signal;
a peripheral circuit supplying a periodic wake-up signal;
a central processing unit having a first operating mode at full power, in which the first clock signal is applied to the central processing unit; an active halt mode, in which the main oscillator circuit and the central processing unit are deactivated, the central processing unit being awakened by the periodic wake-up signal;
a secondary oscillator circuit adapted to supply a second clock signal of lower frequency than the first clock signal;
a circuit adapted to manage clock signals being arranged for, upon the wake-up of the central processing unit at the end of the active halt mode, waking up the secondary oscillator circuit and applying the second clock signal to the central processing unit so as to clock the central processing unit to the frequency of the second clock signal and thus obtain a second operating mode with reduced current consumption relative to the first operating mode, the circuit being operable to provide a transient state after waking up the secondary oscillator circuit in which the management circuit does not supply any clock signal at its clock output, the clock output being set to a selected voltage level so as to avoid interference during transitions between being clocked at a first clock signal rate and a second clock signal rate; and
wherein the circuit for managing clock signals is arranged for performing a reconfiguration operation, when a halt command is applied while the first clock signal is being applied to the central processing unit, an operation in which the secondary oscillator circuit is awakened and the second clock signal is pre-selected to be applied to the central processing unit, so as to automatically wake itself up in the second operating mode with reduced current consumption at the end of the halt mode.

24. A method of operating a circuit comprising:
operating a CPU at a first high frequency provided by a high frequency clock;
halting the operation of the CPU and placing it in a sleep mode;
halting the operation of the high frequency clock for at least a part of the time while the CPU is in steep mode so that during this time period both the CPU and the high frequency clock are in sleep mode;
awakening the CPU under control of the wakeup clock after the CPU has been in sleep mode for a period of time;
inputting a low frequency clock to the CPU upon its initially waking up from the sleep mode, the low frequency clock having a lower operating frequency and a lower power consumption than the high frequency clock, the CPU operating at the clock rate of the low frequency clock upon initially being awakened from the sleep mode;
performing a check of pending operations at the low clock frequency to determine the number of operations which are pending upon being awakened from the sleep mode;
maintaining operation of the second clock if the number of operations is below a selected number;
turning on the high frequency clock and beginning operation of the CPU at the high frequency clock rate in the event the number of pending operations is higher than the selected number; and
returning to sleep mode after completing the pending operations if the CPU continues to be clocked at the low frequency clock rate indicating that there are a very low number of pending operations and that the CPU is able to return to sleep mode very soon and spending the entire awake cycle being driven by the low frequency clock without the high frequency clock being enabled.

25. A method of operating a circuit comprising:
operating a CPU at a first high frequency provided by a high frequency clock;
halting the operation of the CPU and placing it in a sleep mode;
halting the operation of the high frequency clock for at least a part of the time while the CPU is in sleep mode so that during this time period both the CPU and the high frequency clock are in sleep mode;
awakening the CPU under control of the wakeup clock after the CPU has been in sleep mode for a period of time;
inputting a low frequency clock to the CPU upon its initially waking up from the sleep mode, the low frequency clock having a lower operating frequency and a lower power consumption than the high frequency clock, the CPU operating at the clock rate of the low frequency clock upon initially being awakened from the sleep mode; and
returning to sleep mode after completing the pending operations if the CPU continues to be clocked at the low frequency clock rate indicating that there are a very low number of pending operations and that the CPU is able to return to sleep mode very soon and spending the entire awake cycle being driven by the low frequency clock without the high frequency clock being enabled.

* * * * *